(12) United States Patent
Doherty et al.

(10) Patent No.: US 10,051,049 B2
(45) Date of Patent: *Aug. 14, 2018

(54) SYSTEM AND METHOD FOR PEER TO PEER UTILITY SHARING

(71) Applicant: International Business Machines Corporation, Armonk, NY (US)

(72) Inventors: Jessica P. Doherty, Poughkeepsie, NY (US); Heidi Lagares-Greenblatt, Highland, NY (US); Justin A. McCoy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,059

(22) Filed: Oct. 13, 2017

(65) Prior Publication Data

US 2018/0041574 A1 Feb. 8, 2018

Related U.S. Application Data

(63) Continuation of application No. 14/921,010, filed on Oct. 23, 2015, now Pat. No. 9,912,745, which is a
(Continued)

(51) Int. Cl.
*G06F 15/16* (2006.01)
*H04L 29/08* (2006.01)
(Continued)

(52) U.S. Cl.
CPC ......... *H04L 67/1068* (2013.01); *H04L 51/32* (2013.01); *H04L 61/10* (2013.01); *H04L 67/1078* (2013.01)

(58) Field of Classification Search
USPC ....... 709/203, 206, 217, 219, 223, 224, 226, 709/228, 230, 231, 232, 238; 715/716,
(Continued)

(56) References Cited

U.S. PATENT DOCUMENTS

| 8,429,287 B2 * | 4/2013 | Sullivan | .................. H04N 7/24 709/203 |
| 8,954,611 B2 | 2/2015 | Chan et al. | |

(Continued)

OTHER PUBLICATIONS

IBM List of Patents or Patent Applications to be Treated as Related (for Examiner Information only) dated Oct. 13, 2017, pp. 1-2.

*Primary Examiner* — Quang N Nguyen
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, at a second computing device by a first computing device, an invitation to establish a peer to peer communication channel. The second computing device may accept the invitation. An application may be utilized on the second computing device. Content created by the application on the second computing device may be automatically shared with the first computing device, via the peer to peer communication channel, based upon utilization of the application on the second computing device. Access to the content may be prevented on the second computing device.

11 Claims, 6 Drawing Sheets

Related U.S. Application Data continuation of application No. 14/842,927, filed on Sep. 2, 2015, now Pat. No. 9,871,858.

(51) Int. Cl.
*H04L 12/58* (2006.01)
*H04L 29/12* (2006.01)

(58) Field of Classification Search
USPC .............................. 715/723; 726/27; 704/225
See application file for complete search history.

(56) References Cited

U.S. PATENT DOCUMENTS

| | | | |
|---|---|---|---|
| 9,223,942 B2* | 12/2015 | Fay | G06F 21/10 |
| 2001/0052019 A1* | 12/2001 | Walters | G06Q 30/06 |
| | | | 709/219 |
| 2006/0267860 A1 | 11/2006 | Rinaldo, Jr. et al. | |
| 2007/0254640 A1 | 11/2007 | Bliss | |
| 2008/0166966 A1 | 7/2008 | Hamasaki et al. | |
| 2009/0111378 A1 | 4/2009 | Sheynman et al. | |
| 2010/0291913 A1 | 11/2010 | Xu | |
| 2013/0232419 A1* | 9/2013 | Yates | G06F 3/0484 |
| | | | 715/723 |
| 2014/0006947 A1* | 1/2014 | Garmark | G06F 3/0484 |
| | | | 715/716 |
| 2014/0170978 A1 | 6/2014 | Wolman et al. | |
| 2014/0365678 A1* | 12/2014 | Herrfurt | H04H 20/106 |
| | | | 709/231 |
| 2015/0121451 A1 | 4/2015 | Giguiere et al. | |
| 2015/0121541 A1* | 4/2015 | Fay | G06F 21/10 |
| | | | 726/27 |
| 2016/0055859 A1* | 2/2016 | Finlow-Bates | G10L 21/0202 |
| | | | 704/225 |

* cited by examiner

SYSTEM AND METHOD FOR PEER TO PEER UTILITY SHARING

RELATED APPLICATIONS

The subject application is a continuation application of U.S. patent application with Ser. No. 14/921,010, filed on Oct. 23, 2015, which is a continuation application of U.S. patent application with Ser. No. 14/842,927, filed on Sep. 2, 2015, the entire contents of which is herein incorporated by reference.

BACKGROUND

The advent of computing devices (e.g., smart phones) enables a large amount of information to be readily available nearly anywhere in world. Moreover, the phones now have the ability to do other things, such as take pictures with remarkable clarity. Unfortunately, people may have sensitive information stored on their phones, which if stolen, may present a risk of, e.g., identify theft. Additionally, smart phones may be expensive, which may be an additional cost if their phone is stolen or damaged. However, some people may risk the theft/damage to their phones when they hand it to a stranger (or even a friend) to take their picture (or use another application).

BRIEF SUMMARY OF DISCLOSURE

In one example implementation, a method, performed by one or more computing devices, may include but is not limited to receiving, at a second computing device by a first computing device, an invitation to establish a peer to peer communication channel. The second computing device may accept the invitation. An application may be utilized on the second computing device. Content created by the application on the second computing device may be automatically shared with the first computing device, via the peer to peer communication channel, based upon utilization of the application on the second computing device. Access to the content may be prevented on the second computing device.

One or more of the following example features may be included. The application may include a camera application. Preventing access to the content on the second computing device may include at least one of automatically deleting the content from the second computing device and writing the content directly to a media stream via the peer to peer communication channel without storing the content at the second computing device. Automatically sharing with the first computing device, via the peer to peer communication channel, the content created by the application on the second computing device may include sending the content from the first computing device to the second computing device via a media stream. Specification data associated with hardware used by the application on the second computing device may be sent from the second computing device to the first computing device. Automatically sharing may include uploading the content to social media. Automatically sharing may include sharing the content with a plurality of computing devices connected to the peer to peer communication channel.

In another example implementation, a computing system includes a processor and a memory configured to perform operations that may include but are not limited to receiving, at a second computing device by a first computing device, an invitation to establish a peer to peer communication channel. The second computing device may accept the invitation. An application may be utilized on the second computing device. Content created by the application on the second computing device may be automatically shared with the first computing device, via the peer to peer communication channel, based upon utilization of the application on the second computing device. Access to the content may be prevented on the second computing device.

One or more of the following example features may be included. The application may include a camera application. Preventing access to the content on the second computing device may include at least one of automatically deleting the content from the second computing device and writing the content directly to a media stream via the peer to peer communication channel without storing the content at the second computing device. Automatically sharing with the first computing device, via the peer to peer communication channel, the content created by the application on the second computing device may include sending the content from the first computing device to the second computing device via a media stream. Specification data associated with hardware used by the application on the second computing device may be sent from the second computing device to the first computing device. Automatically sharing may include uploading the content to social media. Automatically sharing may include sharing the content with a plurality of computing devices connected to the peer to peer communication channel.

In another example implementation, a computer program product resides on a computer readable storage medium that has a plurality of instructions stored on it. When executed by a processor, the instructions cause the processor to perform operations that may include but are not limited to receiving, at a second computing device by a first computing device, an invitation to establish a peer to peer communication channel. The second computing device may accept the invitation. An application may be utilized on the second computing device. Content created by the application on the second computing device may be automatically shared with the first computing device, via the peer to peer communication channel, based upon utilization of the application on the second computing device. Access to the content may be prevented on the second computing device.

One or more of the following example features may be included. The application may include a camera application. Preventing access to the content on the second computing device may include at least one of automatically deleting the content from the second computing device and writing the content directly to a media stream via the peer to peer communication channel without storing the content at the second computing device. Automatically sharing with the first computing device, via the peer to peer communication channel, the content created by the application on the second computing device may include sending the content from the first computing device to the second computing device via a media stream. Specification data associated with hardware used by the application on the second computing device may be sent from the second computing device to the first computing device. Automatically sharing may include uploading the content to social media. Automatically sharing may include sharing the content with a plurality of computing devices connected to the peer to peer communication channel.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
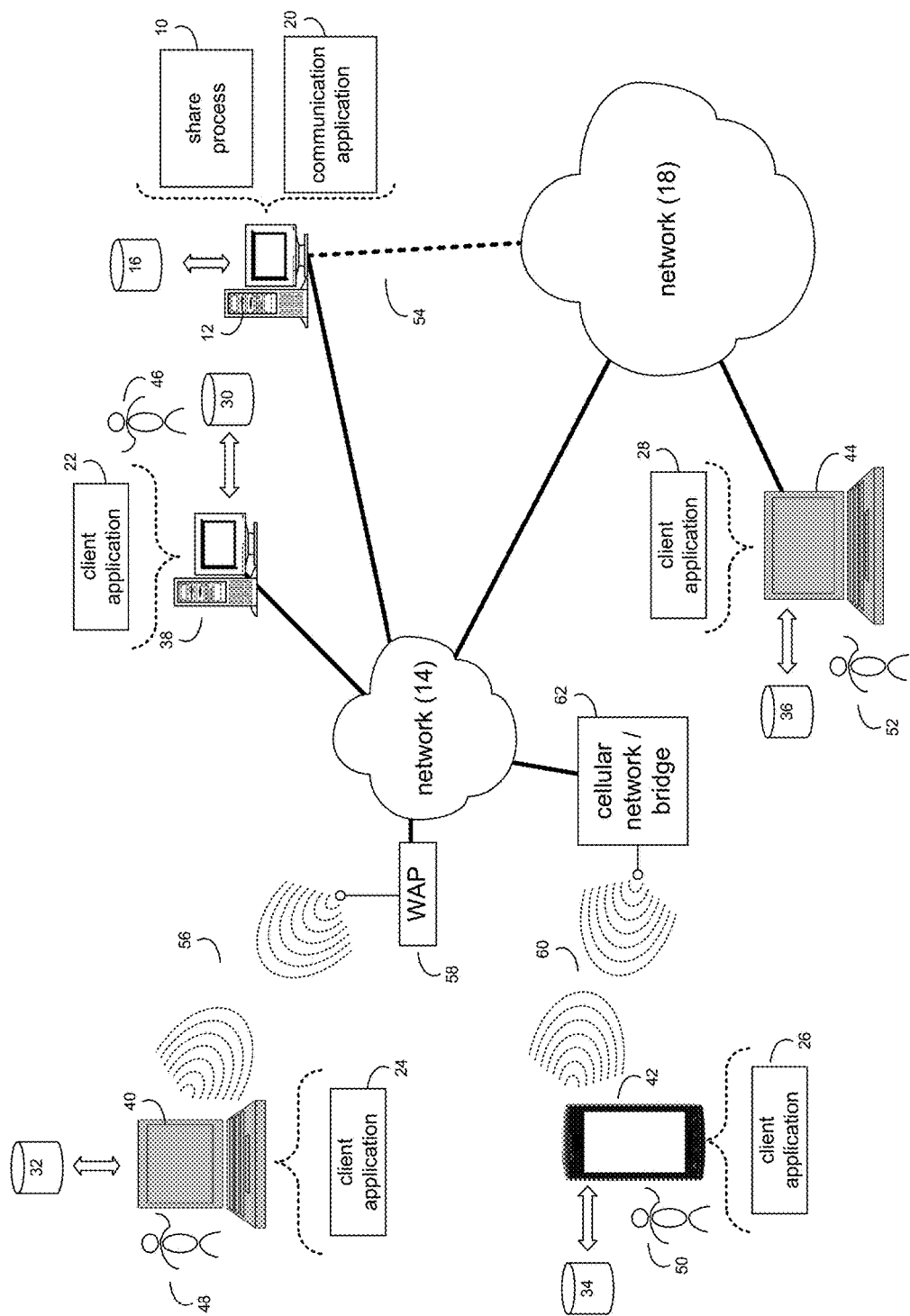
FIG. 1 is an example diagrammatic view of a share process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown share process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, share process 10 may receive, at a second computing device by a first computing device, an invitation to establish a peer to peer communication channel. The second computing device may accept the invitation. An application may be utilized on the second computing device. Content created by the application on the second computing device may be automatically shared with the first computing device, via the peer to peer communication channel, based upon utilization of the application on the second computing device. Access to the content may be prevented on the second computing device.

The instruction sets and subroutines of share process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Share process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a communication application (e.g., communication application 20), examples of which may include, but are not limited to, e.g., a peer to peer (P2P) application, a wireless access point application, a Near Field Communication (NFC) application, a "Platform as a Service" application, or other application that allows for electronic devices to be interconnected to share data (e.g., using a short-range and/or long-range wireless connection). Share process 10 and/or communication application 20 may be accessed via client applications 22, 24, 26, 28. Share process 10 may be a standalone application, or may be an applet/application/script/extension that may interact with and/or be executed within communication application 20, a component of communication application 20, and/or one or more of client applications 22, 24, 26, 28. Communication application 20 may be a standalone application, or may be an applet / application/script/extension that may interact with and/or be executed within share process 10, a component of share process 10, and/or one or more of client applications 22, 24, 26, 28. One or more of client applications 22, 24, 26, 28 may be a standalone application, or may be an applet/application/script/extension that may interact with and/or be executed within and/or be a component of share process 10 and/or communication application 20. Examples of client applications 22, 24, 26, 28 may include, but are not limited to, e.g., a peer to peer (P2P) application, a wireless access point application, a Near Field Communication (NFC) application, or other application that allows for electronic devices to be interconnected to share data (e.g., using a short-range and/or long-range wireless connection), a "Platform as a Service" application, a standard and/or mobile web browser, an email application (e.g., an email client application), a camera application, a textual and/or a graphical user interface, an Instant Messaging (IM)/"chat" application, a short messaging service (SMS)/multimedia messaging service (MMS) application, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of share process 10 (and vice versa). Accordingly, share process 10 may be a purely server-side application, a purely client-side application, or a hybrid server-side/client-side application that is cooperatively executed by one or more of client applications 22, 24, 26, 28 and/or share process 10.

One or more of client applications 22, 24, 26, 28 may be configured to effectuate some or all of the functionality of communication application 20 (and vice versa). Accordingly, communication application 20 may be a purely server-side application, a purely client-side application, or a hybrid server-side/client-side application that is cooperatively executed by one or more of client applications 22, 24, 26, 28 and/or communication application 20. As one or more of client applications 22, 24, 26, 28, share process 10, and communication application 20, taken singly or in any combination, may effectuate some or all of the same functionality, any description of effectuating such functionality via one or more of client applications 22, 24, 26, 28, share process 10, communication application 20, or combination thereof, and any described interaction(s) between one or more of client applications 22, 24, 26, 28, share process 10, communication application 20, or combination thereof to effectuate such functionality, should be taken as an example only and not to limit the scope of the disclosure.

Users 46, 48, 50, 52 may access computer 12 and share process 10 (e.g., using one or more of client electronic devices 38, 40, 42, 44) directly through network 14 or through secondary network 18. Further, computer 12 may be connected to network 14 through secondary network 18, as illustrated with phantom link line 54. Share process 10 may include one or more user interfaces, such as browsers and textual or graphical user interfaces, through which users 46, 48, 50, 52 may access share process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
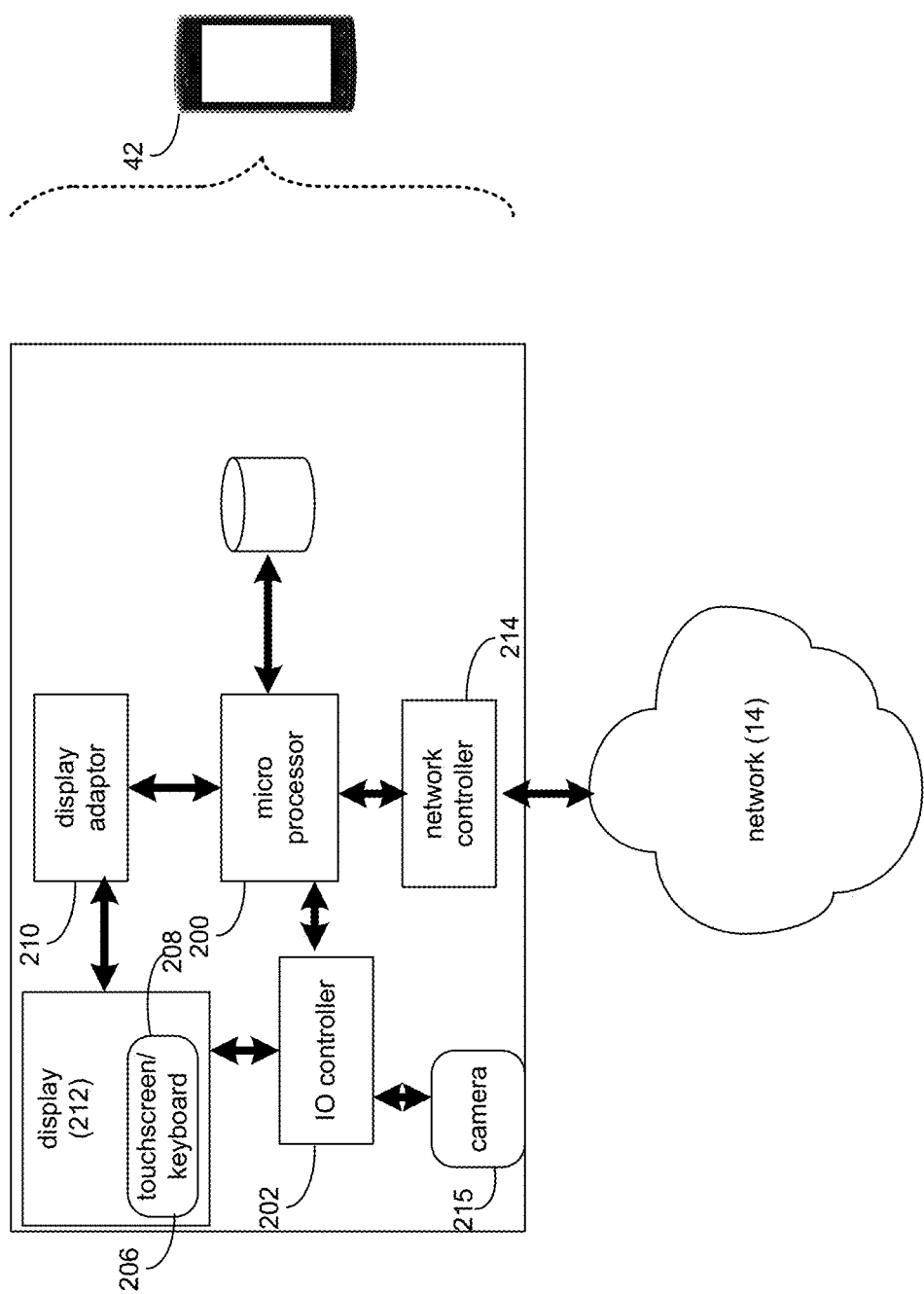
FIG. 2 is an example diagrammatic view of a client electronic device of FIG. 1 according to one or more example implementations of the disclosure.
Figure 3:
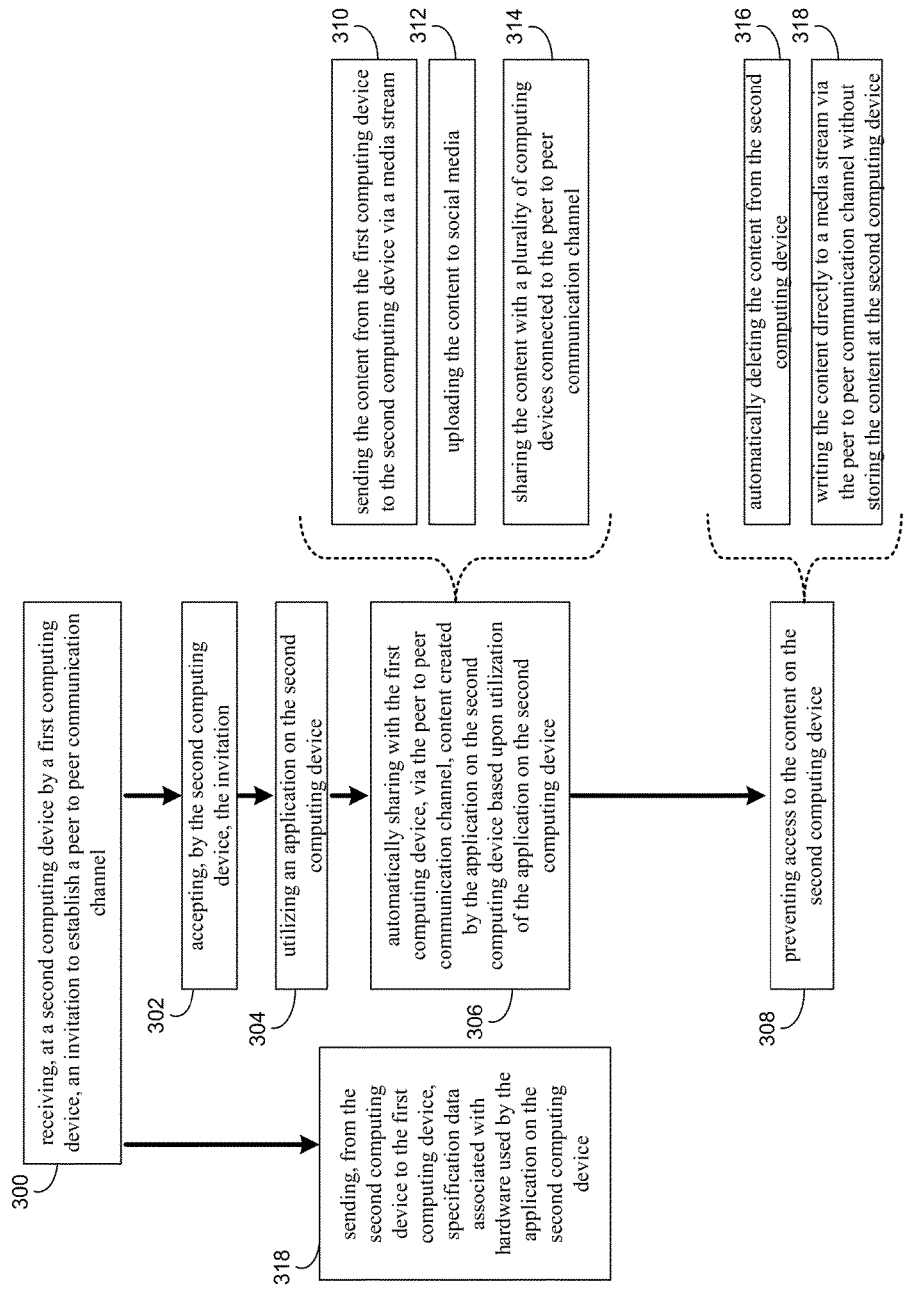
FIG. 3 is an example flowchart of the share process of FIG. 1 according to one or more example implementations of the disclosure.
Figure 4:
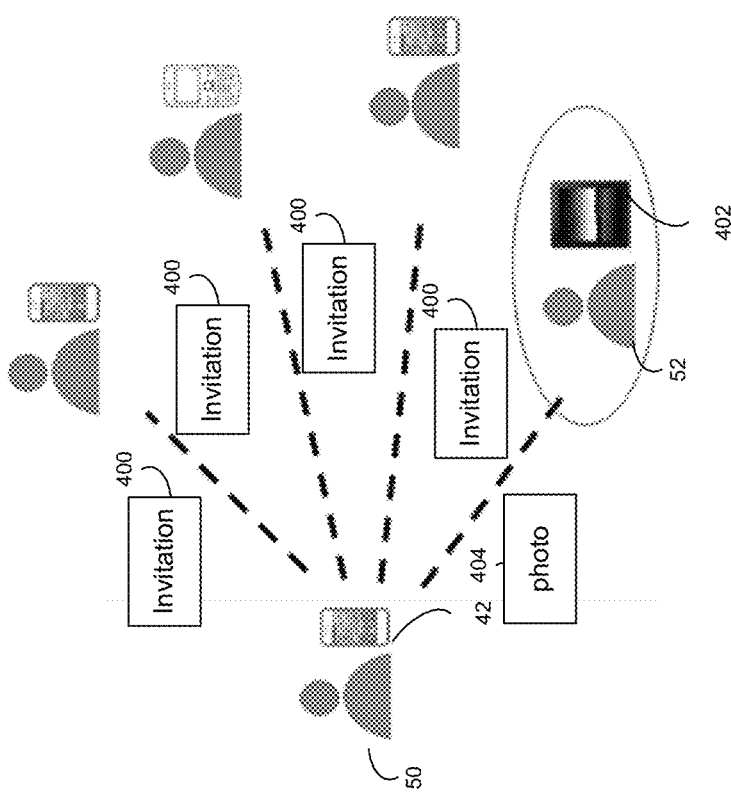
FIG. 4 is an example diagrammatic view of an invitation exchange sent by the share process of FIG. 1 according to one or more example implementations of the disclosure.
Figure 5:
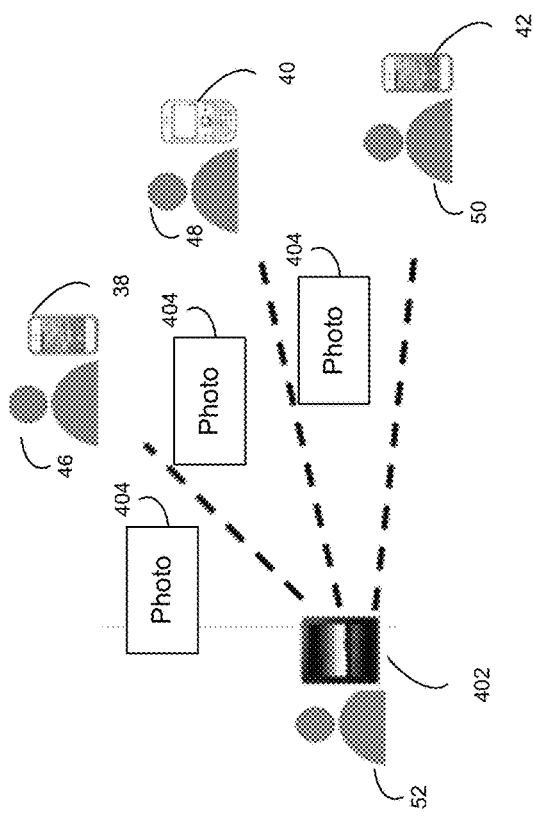
FIG. 5 is an example diagrammatic view of a photo exchange shared by the share process of FIG. 1 according to one or more example implementations of the disclosure.
Figure 6:
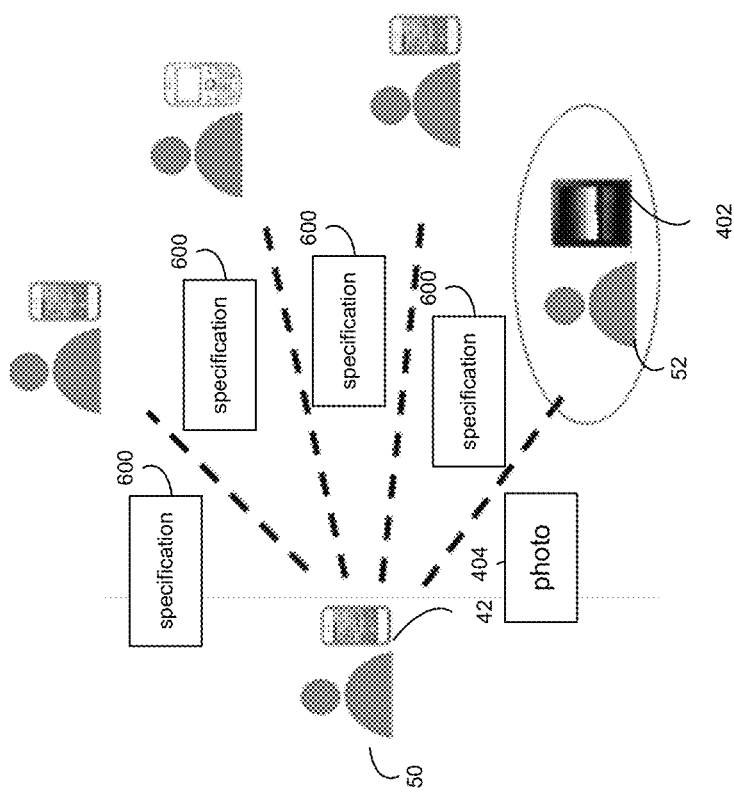
FIG. 6 is an example diagrammatic view of a specification sharing by the share process of FIG. 1 according to one or more example implementations of the disclosure.

Referring also to FIG. 2, there is shown a diagrammatic view of client electronic device 42. While client electronic device 42 is shown in this figure, this is for illustrative purposes only and is not intended to be a limitation of this disclosure, as other configurations are possible. For example, any computing device capable of executing, in whole or in part, share process 10 may be substituted for client electronic device 42 within FIG. 2, examples of which may include but are not limited to computer 12 and/or client electronic devices 38, 40, 44, or other various smart devices.

Client electronic device 42 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various internal and/or external devices, such as keyboard 206, pointing/selecting device (e.g., touchpad, touchscreen 208, mouse, etc.), custom device (e.g., camera 215), USB ports (not shown), and printer ports (not shown). A display adaptor (e.g., display adaptor 210) may be configured to couple display 212 (e.g., touchscreen display/monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The Share Process:

As discussed above and referring also at least to FIGS. 3-6, share process 10 may receive 300, at a second computing device by a first computing device, an invitation to establish a peer to peer communication channel. Share process 10 may, via the second computing device, accept 302 the invitation. Share process 10 may utilize 304 an application on the second computing device. Content created by the application on the second computing device may be automatically shared 306 by share process 10 with the first computing device, via the peer to peer communication channel, based upon utilization of the application on the second computing device. Access to the content may be prevented 308 on the second computing device by share process 10.

As noted above, the advent of computing devices (e.g., smart phones) enables a large amount of information to be readily available nearly anywhere in world. Moreover, the phones now have the ability to do other things, such as take pictures with remarkable clarity. Unfortunately, people may have sensitive information stored on their phones, which if stolen, may present a risk of, e.g., identify theft. Additionally, smart phones may be expensive, which may be an additional cost if their phone is stolen or damaged. However, some people may risk the theft/damage to their phones when they hand it to an untrusted person (e.g., stranger or even an acquaintance/friend) to take their picture (or use another application). As will be discussed in greater detail below, share process 10 may help avoid such a risk by enabling the stranger's phone to take and send the photo (e.g., picture, video, etc.) to the person in the photo without providing the stranger access to the photo or other sensitive information, such as phone numbers of the person in the photo. While the following discussion involves a camera utility/application, it will be appreciated that any other utility/application may be used without departing from the scope of the disclosure. As such, the use of a camera application should be taken as example only and not to limit the scope of the disclosure.

In some implementations, share process 10 may receive 300, at a second computing device by a first computing device, an invitation to establish a peer to peer communication channel. For instance, and referring at least to FIG. 4, assume for example purposes only that a user (e.g., user 50) is with friends (e.g., user 46 and user 48). Further assume that user 50 would like to someone to take a photo of user 50, user 46, and user 48 together. Further assume that user 50 does not wish to let anyone else handle their smart phone (e.g., the first computing device) to take the picture. In the example, share process 10 may send out an invitation (e.g., invitation 400) to establish a peer to peer communication channel with other computing devices within a predefined distance (e.g., 20 feet) from smart phone 42. In some implementations, the invitation may be automatically sent upon opening of the camera application; however, other methods to send the invitation may be used. For example, an object located on the user interface of smart phone 42 may be selected by user 50 via share process 10, which may then send invitation 400. In the example, invitation 400 may send a prompt to one or more of the above-noted computing devices within the predefined distance, which may ask whether or not the user is willing to take a picture for user 50.

In some implementations, share process 10 may, via the second computing device, accept 302 the invitation. For instance, further assume in the example that user 52 (via share process 10) has received 300 invitation 400 and has accepted by, e.g., selecting an object on the user interface of smart phone 402 (e.g., the second computing device). In the example, a communication channel may now be open between smart phone 402 and smart phone 42.

In some implementations, share process 10 may utilize 304 an application on the second computing device. For instance, the application may include a camera application. In some implementations, as invitation 400 was for taking a photo, acceptance 302 of invitation 400 may further enable sharing of only the camera functionality. In some implementations, a notification may be displayed on the user interface for the camera application on smart phone 404 by share process 10 to alert and remind user 52 that photos taken while connected to smart phone 42 may be sent to smart phone 42. As noted above, while the following discussion involves a camera utility/application, it will be appreciated that any other utility/application may be used without departing from the scope of the disclosure. As such, the use of a camera application should be taken as example only and not to limit the scope of the disclosure.

In some implementations, content created by the application on the second computing device may be automatically shared 306 by share process 10 with the first computing device, via the peer to peer communication channel, based upon utilization of the application on the second computing device. For instance, content (e.g., media, photos, videos, etc.) taken by smart phone 402 while connected via the peer to peer communication channel may be automatically shared 306 with smart phone 42. For example, assume that while connected via the peer to peer communication channel, smart phone 402 takes one or more photos (e.g., photo 404). In the example, photo 404 may be automatically shared 306 with smart phone 42, such that smart phone 42 (via share process 10) may have the ability to view and/or store photo 404 on smart phone 42. In some implementations, share process 10 may enable user 50 to view photo 404 on smart phone 42 such that user 42 may have the option to delete photo 404 rather than being stored if user 50 does not like photo 404. Without requiring user 52 to walk over and show user 50 photo 404 for approval, which may be burdensome, sharing 306 photo 404 with smart phone 42 over the peer to peer communication may allow user 50 to quickly determine whether photo 404 is sufficient, or if another photo should be taken by smart phone 402. In some implementations, photo 404 may be shared 306 with smart phone 42 by, e.g., email, text, IM, etc. In some implementations, the necessary information (e.g., email address, phone number for text, screenname for IM, etc.) needed to share 306 photo 404 with smart phone 42 may be temporarily sent to smart phone 402 for the purposes of sharing 306 photo 404, which may be deleted after photo 404 is shared 306. In some implementations, share process 10 may prevent user 52 from accessing that information at any time, thereby maintaining the privacy of user 50. In some implementations, that information may not be sent to smart phone 402, and instead only photo 404 may be sent to smart phone 42, where share process 10 may then have access to the appropriate information (e.g., stored on storage device 34) to share 306 photo 404 as desired.

In some implementations, automatically sharing 306 with the first computing device, via the peer to peer communication channel, the content created by the application on the second computing device may include sending 310 the content from the first computing device to the second computing device via a media stream. In some implementations, access to the content may be prevented 308 on the second computing device by share process 10. Preventing 308 access to the content on the second computing device may include at least one of automatically deleting 316 the content from the second computing device (discussed in greater detail below) and writing 318 the content directly to a media stream via the peer to peer communication channel without storing the content at the second computing device. For instance, in the example, sending 310 the content from smart phone 402 to smart phone 42 via the media stream may enable the capture and sharing 306 of photo 404 without requiring photo 404 to be first stored on smart phone 402. For example, in a typical camera phone operation, when an application controls a piece of hardware (e.g., such as the camera from smart phone 402), the application may send a command to the camera. The camera may respond and perform an action based off that command. If the byte command was to take a picture, for example, the camera may take photo 404 and begin writing a stream of bytes to smart phone 402's data output port. The application, in control and owner of the camera, knows it has issued a command to take photo 402, and may begin to read this stream of bytes directly from the cameras data output port. However, in some implementations, instead of creating a buffer in the application for all the bytes being read from the camera, and then performing the processing to convert those bytes to an image format that then is interpreted by the application for display or to be saved in a file on smart phone 402, share process 10 may write 318 the bytes as they come off the camera to a "media" stream (e.g., directly to the established communication channel stream between smart phone 402 and smart phone 42). In the example, "hijacking" the file stream and directly writing 318 to the network via the established communication channel may prevent smart phone 402 from ever having content (e.g., photo 402) to delete. As such, in the example, smart phone 402 may be prevented 308 from displaying, storing and/or accessing photo 404, thereby making photo 404 "invisible" to smart phone 402 and making user 50 the sole owner of photo 404. Moreover, in some implementations, while the peer to peer communication channel may be bi-directional between smart phone 42 and smart phone 402, the data flow may be unidirectional from smart phone 402 to smart phone 42. In some implementations, share process 10 may provide a user interface with the ability for user 50 (via smart phone 42) to enable/disable privacy settings that may allow the storing and/or accessing of photo 404 on smart phone 402. As such, the level of privacy desired by user 50 may be customized.

In some implementations, automatically sharing 306 may include uploading 312 the content to social media or another service. For instance, the necessary information (e.g., social media website, password, username, etc.) needed to share 306 photo 404 with smart phone 42 by uploading 312 to social media may be temporarily sent to smart phone 402 for the purposes of sharing 306 photo 404, which may be deleted after photo 404 is uploaded 312. In some implementations, an additional stream may be shared from smart phone 42 with smart phone 402. This additional stream may be connected to user 50's social media or other service where photo 404 may be directly sent 310 via being written to the additional stream. In some implementations, share process 10 may prevent user 52 from accessing that information at any time, thereby maintaining the privacy of user 50. In some implementations, that information may not be sent to smart phone 402, and instead only photo 404 may be sent to smart phone 42, where share process 10 may then have access to the appropriate information (e.g., stored on storage device 34) to upload 312 photo 404 to social media as desired.

In some implementations, the location service (e.g., GPS) of smart phone 42 and/or 402 may enable share process 10 to determine the location of where photo 404 was taken. In the example, a hashtag may be added to photo 404 based upon the location. For instance, assume for example purposes only that photo 404 was taken at Company X in Boston. In the example, photo 404 uploaded 312 to social media may add the hashtag "#CompanyX" and/or "#Boston". In some implementations, Company X may give user 50 credit for Company X being able to use photo 404 in their advertising.

In some implementations, automatically sharing 306 may include sharing 314 the content with a plurality of computing devices connected to the peer to peer communication channel. For instance, and referring at least to FIG. 5, assume that users 46 and 48 also want a copy of photo 404. In the example, users 46 and 48 may have also accepted 402 the above-noted invitation via their respective computing devices 38 and 40. In the example, share process 10 may automatically share 314 photo 404 with computing devices 38 and 40 similarly as discussed above with regard to smart phone 42. Thus, in the example, photo 404 taken by smart phone 402 while connected via the peer to peer communication channel may be simultaneously shared 314 with smart phone 42 and computing devices 38 and 40.

In some implementations, specification data associated with hardware used by the application on the second computing device may be sent 316 by share process 10 from the second computing device to the first computing device. For instance, and referring at least to FIG. 6, share process 10 may be implemented as a service. In the example, the specification data associated with the camera (e.g., pixel count, smart phone model, smart phone software model, etc.) may be sent 316 from smart phone 402 to smart phone 42. In the example any other computing devices that have accepted and/or received invitation 400 may also receive (via share process 10) a request to send smart phone 42 the specification data. In some implementations, specification data sent 316 to smart phone 42 may enable user 50 (via smart phone 42) to view the types of cameras (via a user interface of smart phone 42) that may be used to take photo 404. In the example, share process 10 may enable user 50 to select which person (i.e., smart phone) to use when taking photo 404 based upon, e.g., the smart phone with the best camera.

In some implementations, share process 10 may provide user 52 with a rating based upon, e.g., the number of times user 52 has accepted invitations to take photos, a rating provided by user 50 based upon how good photo 404 came out, etc. In the example, share process 10 may enable user 50 to select which person (i.e., smart phone) to use when taking photo 404 based upon, an ordered ranking of the user's ratings that have accepted 302 invitation 400.

As noted above, access to the content may be prevented 308 on the second computing device by share process 10. In some implementations, preventing 308 access to the content on the second computing device may include share process 10 automatically deleting 318 the content from the second computing device. For instance, assume for example purposes only that smart phone 402 capturing photo 404 requires storing (at least temporarily) photo 404 on smart phone 402. In the example, share process 10 may automatically delete 318 photo 404 from smart phone 402 based upon photo 404 being shared 306 with smart phone 42. In some implementations, share process 10 may automatically delete 318 photo 404 from smart phone 402 based upon severing the peer to peer communication channel between smart phone 42 and smart phone 402. In some implementations, share process 10 may enable user 50 (via smart phone 42) to sever the peer to peer communication channel at any time, e.g., by closing the application.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, at a second computing device by a first computing device, an invitation to establish a peer to peer communication channel;
accepting, by the second computing device, the invitation;
sending, from the second computing device to the first computing device, specification data associated with hardware used by the application on the second computing device;
utilizing an application on the second computing device, wherein the application includes a camera application;
automatically sharing with the first computing device, via the peer to peer communication channel, content created by the application on the second computing device based upon utilization of the application on the second computing device; and
preventing access to the content on the second computing device includes at least one of automatically deleting the content from the second computing device and writing the content directly to a media stream via the peer to peer communication channel without storing the content at the second computing device.

2. The computer-implemented method of claim 1 wherein automatically sharing with the first computer device, via the peer to peer communication channel, the content created by the application on the second computing device includes sending the content from the first computing device to the second computing device via a media stream.

3. The computing-implemented method of claim 1 wherein automatically sharing includes uploading the content to social media.

4. The computing-implemented method of claim 1 wherein automatically sharing includes sharing the content with a plurality of computing devices connected to the peer to peer communication channel.

5. A computer program product residing on a non-transitory computer readable storage medium having a plurality of instructions stored thereon which, when executed by a processor, cause the processor to perform operations comprising:
receiving, at a second computing device by a first computing device, an invitation to establish a peer to peer communication channel;
accepting, by the second computing device, the invitation;
sending, from the second computing device to the first computing device, specification data associated with hardware used by the application on the second computing device;
utilizing an application on the second computing device, wherein the application includes a camera application;
automatically sharing with the first computing device, via the peer to peer communication channel, content created by the application on the second computing device based upon utilization of the application on the second computing device; and
preventing access to the content on the second computing device includes at least one of automatically deleting the content from the second computing device and writing the content directly to a media stream via the peer to peer communication channel without storing the content at the second computing device.

6. The computer program product of claim 5 wherein automatically sharing with the first computing device, via the peer to peer communication channel, the content created by the application on the second computing device includes sending the content from the first computing device to the second computing device via a media stream.

7. The computer program product of claim 5 wherein automatically sharing includes uploading the content to social media.

8. The computer program product of claim 5 wherein automatically sharing includes sharing the content with a plurality of computing devices connection to the peer to peer communication channel.

9. A computing system including a processor and a memory configured to perform operations comprising:
receiving, at a second computing device by a first computing device, an invitation to establish a peer to peer communication channel;
accepting, by the second computing device, the invitation;
sending, from the second computing device to the first computing device, specification data associated with hardware used by the application on the second computing device;
utilizing an application on the second computing device, wherein the application includes a camera application;
automatically sharing with the first computing device, via the peer to peer communication channel, content created by the application on the second computing device based upon utilization of the application on the second computing device; and
preventing access to the content on the second computing device includes at least one of automatically deleting the content from the second computing device and writing the content directly to a media stream via the peer to peer communication channel without storing the content at the second computing device.

10. The computing system of claim 9 wherein automatically sharing with the first computing device, via the peer to peer communication channel, the content created by the application on the second computing device includes sending the content from the first computing device to the second computing device via a media stream.

11. The computing system of claim 9 wherein automatically sharing includes uploading the content to social media.

* * * * *